(12) United States Patent
Kuhlmann et al.

(10) Patent No.: US 8,932,684 B2
(45) Date of Patent: Jan. 13, 2015

(54) MULTI-LAYER PRODUCTS COMPRISING ACRYLATE CONTAINING COATINGS

(75) Inventors: Timo Kuhlmann, Leichlingen (DE); Diethelm Rappen, Rheinberg (DE); Peter Schwarz, Krefeld (DE)

(73) Assignee: Bayer MaterialScience AG (DE)

( * ) Notice: Subject to any disclaimer, the term of this patent is extended or adjusted under 35 U.S.C. 154(b) by 0 days.

(21) Appl. No.: 13/387,128

(22) PCT Filed: Jul. 28, 2010

(86) PCT No.: PCT/EP2010/004615
§ 371 (c)(1),
(2), (4) Date: Feb. 7, 2012

(87) PCT Pub. No.: WO2011/012294
PCT Pub. Date: Feb. 3, 2011

(65) Prior Publication Data
US 2012/0121920 A1 May 17, 2012

(30) Foreign Application Priority Data
Jul. 29, 2009 (DE) .......................... 10 2009 035 115

(51) Int. Cl.
*B05D 3/06* (2006.01)
*C08F 2/46* (2006.01)
(Continued)

(52) U.S. Cl.
CPC ............... *C08J 7/18* (2013.01); *B29C 47/145* (2013.01); *C09D 201/02* (2013.01); *B29C 47/0021* (2013.01); *B05D 7/04* (2013.01); *B29K 2033/08* (2013.01); *C08J 2433/00* (2013.01); *B05D 3/067* (2013.01); *C08J 2369/00* (2013.01); *B29C 47/90* (2013.01); *B29C 47/065* (2013.01);
(Continued)

(58) Field of Classification Search
CPC .................... B29C 66/71; B29C 65/00; B29C 2045/14885; B29C 45/14311; B29K 2081/04
USPC ........................................................ 427/487
See application file for complete search history.

(56) References Cited

U.S. PATENT DOCUMENTS 4,185,009 A   1/1980   Idel et al.
4,707,393 A   11/1987  Vetter
(Continued)

FOREIGN PATENT DOCUMENTS

CA   1064191 A1   10/1979
DE   10 31 512 B   6/1958
(Continued)

OTHER PUBLICATIONS

Studer, K., et al., *Overcoming oxygen inhibition in UV-curing of acrylate coatings by carbon dioxide inerting, Part I* (2003), 48, Progress in Organic Coatings, pp. 92-100.

*Primary Examiner* — Dah-Wei D Yuan
*Assistant Examiner* — Kristen A Dagenais
(74) *Attorney, Agent, or Firm* — Drinker Biddle & Reath LLP

(57) ABSTRACT

The present invention relates to a method for producing a multi-layer product comprising a) a substrate containing at least one thermoplastic substrate layer and b) at least one protective layer made of a coating composition comprising compounds with at least two functional groups, characterized in that the protective layer(s) are/is applied inline after the production of the substrate containing the substrate layer.

11 Claims, 2 Drawing Sheets

(51) Int. Cl.

| | | |
|---|---|---|
| *C08J 7/18* | (2006.01) | |
| *B29C 47/14* | (2006.01) | |
| *C09D 201/02* | (2006.01) | |
| *B05D 7/04* | (2006.01) | |
| *B29C 47/06* | (2006.01) | |
| *C08J 7/04* | (2006.01) | |
| *B29C 47/00* | (2006.01) | |
| *B29K 33/00* | (2006.01) | |
| *B29C 47/90* | (2006.01) | |

(52) U.S. Cl.
CPC ............ *C08J 7/047* (2013.01); *B29C 47/0019* (2013.01); *C08J 7/04* (2013.01)
USPC ............ 427/487; 427/517; 427/558; 428/521

(56) References Cited

U.S. PATENT DOCUMENTS

| | | | |
|---|---|---|---|
| 4,929,506 | A | 5/1990 | Kerr, III et al. |
| 5,235,026 | A | 8/1993 | Wulff et al. |
| 5,271,968 | A * | 12/1993 | Coyle et al. .................. 427/558 |
| 5,367,044 | A | 11/1994 | Rosenquist |
| 5,846,659 | A | 12/1998 | Lower et al. |
| 6,060,543 | A * | 5/2000 | Bolle et al. .................... 524/100 |
| 6,207,744 | B1 | 3/2001 | Paulus et al. |
| 6,225,384 | B1 | 5/2001 | Renz et al. |
| 6,228,973 | B1 | 5/2001 | McCloskey et al. |
| 6,232,360 | B1 | 5/2001 | Meixner et al. |
| 6,255,483 | B1 | 7/2001 | Fletcher et al. |
| 6,316,515 | B1 | 11/2001 | Lake |
| 6,565,967 | B1 | 5/2003 | Bier et al. |
| 6,613,869 | B1 | 9/2003 | Horn et al. |
| 6,659,020 | B1 * | 12/2003 | Ball .......................... 108/57.28 |
| 7,241,494 | B2 | 7/2007 | Koeniger et al. |
| 2002/0083641 | A1 | 7/2002 | Leppard et al. |
| 2002/0120092 | A1 | 8/2002 | Kratschmer et al. |
| 2004/0164446 | A1 * | 8/2004 | Goossens et al. ........ 264/177.1 |
| 2004/0242735 | A1 | 12/2004 | McMan et al. |
| 2005/0250915 | A1 | 11/2005 | Heuer et al. |
| 2007/0232751 | A1 | 10/2007 | Ludewig et al. |
| 2008/0081896 | A1 | 4/2008 | Heuer |
| 2009/0162592 | A1 * | 6/2009 | Baikerikar et al. ............. 428/38 |
| 2009/0224162 | A1 | 9/2009 | Inuiya et al. |
| 2010/0126537 | A1 | 5/2010 | Uchino |
| 2010/0285321 | A1 | 11/2010 | Hildenbrand |

FOREIGN PATENT DOCUMENTS

| | | | |
|---|---|---|---|
| DE | 25 00 092 | A1 | 7/1976 |
| DE | 2928512 | A1 | 1/1981 |
| DE | 2928512 | A1 * | 1/1981 ............... B08D 3/06 |
| DE | 3819627 | A1 | 12/1989 |
| DE | 42 40 313 | A1 | 6/1994 |
| DE | 4438543 | A1 | 5/1996 |
| DE | 19622483 | A1 | 12/1996 |
| DE | 197 39 797 | A1 | 3/1998 |
| DE | 19829165 | A1 | 1/2000 |
| DE | 19 943 642 | A1 | 3/2001 |
| DE | 101 35 795 | A1 | 4/2002 |
| DE | 10 2006 015 709 | A1 | 10/2007 |
| EP | 0 110 238 | A2 | 6/1984 |
| EP | 0110221 | A2 | 6/1984 |
| EP | 0517044 | A2 | 12/1992 |
| EP | 0 668 330 | A1 | 8/1995 |
| EP | 0 716 919 | A2 | 6/1996 |
| EP | 1308084 | A1 | 5/2003 |
| EP | 1506249 | A1 | 2/2005 |
| EP | 1582549 | A1 | 10/2005 |
| EP | 1629053 | A1 | 3/2006 |
| KR | 100863568 | B1 | 10/2008 |
| WO | WO-96/28431 | A1 | 9/1996 |
| WO | WO-00/66675 | A1 | 11/2000 |
| WO | WO-0226862 | A1 | 4/2002 |
| WO | WO-2005113639 | A1 | 12/2005 |
| WO | WO-2008037364 | A1 | 4/2008 |
| WO | WO-2009/01638 | A1 | 12/2008 |
| WO | WO-2009/010193 | A1 | 1/2009 |
| WO | WO-2009/145781 | A1 | 12/2009 |

* cited by examiner

MULTI-LAYER PRODUCTS COMPRISING ACRYLATE CONTAINING COATINGS

CROSS-REFERENCE TO RELATED APPLICATIONS

This application is a national stage application (under 35 U.S.C. §371) of PCT/EP2010/004615, filed Jul. 28, 2010, which claims benefit of German application 10 2009 035 115.9, filed Jul. 29, 2010, both of which are incorporated herein by reference in their entirety for all their useful purposes.

BACKGROUND

The present invention relates to a method of producing a multi-layer product comprising a) a substrate comprising at least one substrate layer and b) at least one protective layer, the substrate layer comprising thermoplastic polymer and the protective layer comprising a coating composition comprising compounds having at least two functional groups, characterized in that the protective layer(s) is/are applied in-line following the production of the substrate comprising the substrate layers, and also to the multi-layer products which are obtainable in accordance with the method of the invention. The multi-layer products produced in accordance with the method of the invention have a coating of very high quality. The method of the invention gives rise to a reliable and environmentally friendly production of these multi-layer products on an extrusion line.

Polycarbonate mouldings are put to a wide variety of uses on account of their excellent properties, such as transparency, impact strength or collision strength, and tensile strength. The properties of the surface of the material, such as low abrasion resistance and scratch resistance, and the low resistance towards chemicals, however, are unsatisfactory in many fields of use, and so in such cases it is necessary to apply special protective layers to the mouldings.

If, for example, polycarbonate mouldings without further treatment are exposed to weathering, then increased yellowing and greying of the polycarbonate surface are observed. Particularly in the area of sheets and films, but also with injection moulded components consisting of polycarbonate, there is a desire in outdoor use for a long-lasting protection from weathering.

In the literature there is no lack of attempts to achieve scratch-resistant and abrasion-resistant, chemical-resistant and weathering-stable polycarbonate mouldings, an example of such attempts being the application of corresponding protective layers. From an economic standpoint it is desirable in particular to carry out the application of the protective layer "in-line", i.e. in one production line directly following the production, for example the extrusion, of the moulding. Unfortunately, as set out below, either the materials that are utilized or the in-line application methods presently described have disadvantages, and so there is a great need for improvement in this field.

DE-A 19622483 describes, for example, a one-stage method for the application of a coating composition that contains no organic solvents at all, consisting of an aqueous dispersion of an inorganic silica sol and a nonionic surfactant, for application to hollow chamber sandwich sheets. The absence of solvents allows the coating material to be processed without explosion-protected apparatus, and is said to be eco-friendly. Thin layers of below 0.4 µm in thickness are described, which are applied in-line to the hot substrate. One disadvantage here is that the evaporated water must be collected and processed. Another is that such thin layers are unable to offer weathering protection to layers lying beneath them.

DE-A 4438543 describes a solvent-free coating which comprises a light stabilizer and is applied in-line by coextrusion during the operation of producing the moulding. This solvent-free and hence environmentally friendly method affords surface-modified mouldings which, however, owing to the use of a thermoplastic polycarbonate as coating material, do not have optimum stability with respect to external influences. For instance, layers of this kind are susceptible to scratch exposures and exposure to agents, and in spite of stabilization, become yellow and hazy after a certain time of weathering.

U.S. Pat. No. 7,241,494 describes UV-curable, solvent-free mixtures which are based on urethane acrylates, are processed in-line by coextrusion to thermoplastics, and are subsequently cured on the semi-finished product by radiation. However, extrusion temperatures of around 170° C. to 220° C. are not processing conditions suitable per se for urethane acrylates, since low molecular mass constituents evaporate from the hot melt, and hence the composition is no longer constant, and it is also possible for the low molecular mass constituents to undergo ignition. Moreover, if there is any deviation in the operating regime, flow patterns develop that have consequences for the transparency and also for the visual appearance of the modified semi-finished product. Another disadvantage of coextrusion is the difference in temperature between the materials used for extrusion and for coextrusion. Especially in the case of polycarbonates, temperatures of up to 300° C. are utilized for extrusion. In the case of materials which are coextruded at significantly lower temperatures, distributions are frequently observed in the thickness of the coextrusion layer, and, in the case of excessively wide mouldings, the edge regions may no longer be entirely covered with coextrusion material. Sheets having a coating of satisfactory quality and having uniform layer thicknesses, ensuring consistent material properties, are therefore not obtained by this method.

DE-A 3819627 discloses UV-curable mixtures comprising reaction products of hydroxyalkyl acrylates with aliphatic polyisocyanates, which contain, among other groups, at least one uretdione group and/or triisocyanurate group and/or biuret group per molecule. The use of mixtures of such urethane acrylates with monofunctional, ethylenically unsaturated compounds as binders for coating materials for polycarbonate is described. From a present-day standpoint, monofunctional compounds of this kind are environmentally objectionable, and are not used in the coating material of the invention. Moreover, although there is reference to the application of the coating material by dipping, spraying and spin-coating onto the mouldings, without solvent, there are no parameters at all disclosed for the method. A defective manufacturing method, such as insufficient reaction of the ethylenically unsaturated double bonds in the binder matrix, for example, may be detrimental to the overall performance of the coated moulding.

EP-A 0 668 330 discloses the use of UV-curable, acrylate-containing coating compositions which can contain 5-80% of reactive diluents and up to 80% of solvents. There is no reference to in-line coating methods, and especially not to knife or roll application, and the examples describe solvent-containing coatings with a reactive diluent content of approximately 60%. The description contains no information on what components must be selected, and in what proportions, in order for the coating composition to be able to be applied without solvent under in-line conditions.

DE 10 2006 015 709 describes a process for preparing allophanate-containing polyurethane polymers which are curable by actinic radiation, but an in-line method for producing multi-layer products is not described.

WO 2009/145781 A1 is a document not published before the priority date of the present specification, and describes UV-curable coating compositions comprising aliphatic urethane acrylate resins, preferably for the production of lenses. Further coating materials for lenses are described in U.S. Pat. No. 6,316,515 B1. Lenses can in general not be coated by the roller method disclosed in the context of the present invention. The in-line method for producing multi-layer products is not mentioned in either of the applications.

U.S. Pat. No. 4,929,506 describes coated polycarbonate articles having a coating containing urethane acrylate, the resultant products comprising the stated coating material being thermoformable after curing. In every case, however, the products produced in the context of the present invention are no longer thermoformable after curing.

KR 100863568 B1 describes an in-line method in which a substrate is first coated and subsequently, before being cured, is provided with a further outer film, which is applied to the coating. If the outer film were not to be applied, however, the product would be merely a coated substrate with a poor surface quality. With the method of the invention, the application of an outer film is not necessary in order to obtain coated products of high quality.

EP 1,629,053 B1 describes photopolymerizable coating materials, but the in-line method of the present invention is not described.

WO 2009/01638 describes hybrid coatings with inorganic constituents; the coatings of the present invention are organic. The method according to the invention is not described either.

US 2009/0224162 A1 describes coated films for automobile applications, where first of all a substrate layer and a colouring layer are assembled by means of an upstream coextrusion or lamination procedure and subsequently, in a separate step, the coating is applied to the colouring layer in an off-line method. The in-line method of the present invention is not described.

In contrast to application carried out off-line, in-line application limits the possibility of extensions to residence times. Another requirement imposed on the coating material applied in-line, therefore, is that it should develop sufficiently strong adhesion to the substrate within the low residence time available. This is usually achieved by the formation of what is called an IPL (interpenetrating layer), in which some of the liquid constituents of the coating material, such as the binder or the reactive diluent, for example, diffuse into the substrate, where, following the subsequent curing of the material, they form a solid connection between substrate and coating layer. In addition to the sufficient formation of the IPL, the adhesive strength of coating layers may additionally be dependent on the quality of the crosslinking of the coating material.

It has to date been assumed that the economically realizable residence times in an in-line method for producing well-adhering coatings of high quality are not sufficient for compositions comprising compounds having at least two functional groups that react by exposure to actinic radiation with ethylenically unsaturated compounds, especially for acrylates. One reason given for this has been the inadequate development of the IPL. In addition, the substrate temperature prevailing during extrusion leads to the heating of the coating material, and hence its increased temperature inhibits the rate of curing of ethylenically unsaturated double bonds in binders by actinic radiation to such a great extent that the coating material is no longer cured specifically in the vicinity of the substrate, and the result of this is that optimum adhesive strength is not achieved.

Thus, for example, K. Studer in "Overcoming oxygen inhibition in UV-curing of acrylate coatings by carbon dioxide inerting, Part I" (Progress in Organic Coatings 48 (2003) pp. 92-100) describes the dependency relationship between the conversion of double bonds in acrylates and temperature for curing both under an inert gas atmosphere and under air. Studer finds that the double bond conversion in air falls as the temperature rises, which is attributed to the effect of oxygen inhibiton. A sufficient conversion of double bonds in the case of acrylate coatings, however, is necessary in order to produce coatings which possess good adhesion to the substrate and resistance.

The adhesion can be increased, indeed, by raising the low molecular mass acrylate fraction in the coating composition, but this is to the detriment of the quality of the coatings—for example, stress cracks are formed in the finished component, or the substrates composed of polycarbonate become hazy. As an example, reference may be made here to Example 1 of EP 0 668 330 A1, which uses about 60% of 1,6-hexanediol diacrylate as a reactive diluent, based on the solids content. The residence time of the uncured coating material on the polycarbonate substrate is given as 3 minutes at room temperature. Independently of the use of additional solvents, the coated sheet becomes hazy when the levels of reactive diluent are this high. Furthermore, coating material compositions of this kind with an excessive content of reactive diluent could no longer be fully cured, hence leaving a sticky surface. It is evident, accordingly, that coating material compositions having too high a reactive diluent content are not suitable for in-line application.

On the basis of the prior art described, therefore, there was a need for coating compositions comprising compounds having at least two functional groups that react by exposure to actinic radiation with ethylenically unsaturated compounds, but are free from solvents and free from monofunctional ethylenically unsaturated compounds. The coatings are to cure rapidly enough that they can be applied in-line to thermoplastic mouldings and yet possess very good coating quality—for example, the coating is to exhibit effective adhesion to the mouldings comprising thermoplastic substrates, even after exposure to extreme conditions, such as storage in boiling water, for example. The coated mouldings ought also to possess excellent weathering stability with gloss retention, high scratch resistance and abrasion resistance and chemical stability.

DESCRIPTION OF EMBODIMENTS

Figure 1:
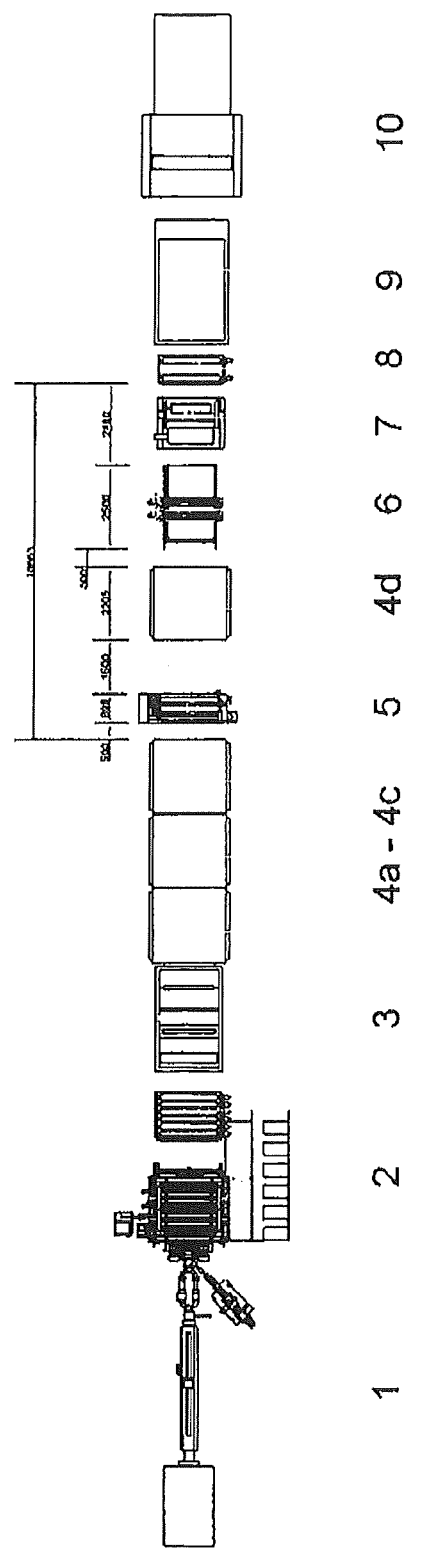
FIG. 1 illustrates a coextrusion and coating line according to an embodiment of the present invention.

For the purposes of the present specification, the expressions (thermoplastic) "substrate" and "moulding" are used synonymously. The expression "multi-layer product" encompasses the substrate or moulding, which may itself be composed of a plurality of layers, the protective layers(s) of the invention, and also, where used, further functional layers.

Coating material compositions have now been found which, when applied under specific method parameters in an in-line method, even at increased temperatures and in short residence times, lead, surprisingly, to effectively adhering coatings of high quality.

A coating of high quality is understood by a person skilled in the art to be a coating which is distinguished, among other qualities, by good levelling. In addition, the coating is free from visual defects, such as particle inclusions, craters or holes, for example. The coating is generally distinguished, furthermore, by a combination of high transparency with low inherent clouding. Coatings of good quality also exhibit good stability with respect to external influences.

The multi-layer products of the invention comprise a single-layer or multi-layer thermoplastic substrate which has been provided on one or both sides with a coating composition consisting of the components A. 30.0% to 80.0% by weight, preferably 40.0%-70.0% by weight, of one or more compounds selected from the group containing compounds having a molar mass of more than 450 g/mol and having at least two functional groups that react by exposure to actinic radiation with ethylenically unsaturated compounds, with polymerization, and which contain no isocyanate groups;

B. 15.0% to 50.0% by weight, preferably 20.0%-40.0% by weight, of reactive diluents containing at least two ethylenically unsaturated groups, C. 0% to 50.0% by weight, preferably 0% to 20.0% by weight, more preferably 0% to 10.0% by weight and likewise more preferably 1%-10% by weight of one or more compounds selected from the group containing isocyanates having at least one ethylenically unsaturated double bond in the molecule, D. 0.01% to 10.0% by weight of light stabilizers based on a triazine derivative, preferably based on a biphenyltriazine derivative;

E. 1.0% to 10.0% by weight of photoinitiators; and

F. optionally, coatings additives known further to a person skilled in the art, the coating having been subsequently cured by actinic radiation to give a thermoset protective layer and preferably >99% of the double bonds from the components A, B and C having reacted.

The amount of aforementioned components used in the coating material composition is to be selected such that the sum of the components is always 100% by weight.

The coating composition contains no solvents, and hence not even the organic solvents that are normally customary in paint chemistry, preferably alkanes, alcohols, esters and ketones or water.

The present invention also relates to a method of producing these coated mouldings of the invention in-line following an extrusion line or coextrusion line.

Surprisingly it has been possible to find that the view expressed to date concerning the possibilities of exerting influence on the adhesion under particular conditions is not valid for the coating compositions of the invention. As a result of this finding, it proved possible to produce thermoplastic substrates with completely solvent-free coatings based on acrylates, in an environmentally friendly and reliable way and at the same time with excellent quality.

In contrast to the assumptions made in the prior art concerning acrylate coatings, it is possible to process the coating compositions of the invention in-line, via the method of the invention, for example, to give coated substrates of very high quality, especially with good adhesion even after exposure. The in-line method of the invention, moreover, is significantly more economical than the widespread retrospective modification of sheet surfaces by spraying, flooding or dipping, since there is virtually no waste. Excess coating material not transformed by actinic radiation can be collected and used again.

Other advantages of the method lie in the absence of paint solvents or monofunctional acrylic esters to regulate the processing viscosity of the coating material. As a result of this, on the one hand, fewer volatile organic fractions are emitted to the local or wider environment, and, on the other hand, human health is distinctly preserved, since a number of paint solvents and also special monofunctional acrylic esters are suspected of being carcinogenic.

The invention further provides the substrates coated with the coating composition of the invention, comprising a layer or a plurality of layers of thermoplastic. Compared with the other solventlessly coated products of the prior art, the coated substrates exhibit a markedly increased scratch resistance and chemical resistance and also a reduced tendency towards yellowing in the case of weathering, thereby increasing the lifetime of the modified product. As compared with coatings produced form solvent-borne compositions, the coatings of the invention are free from solvent residues and also from low molecular mass constituents, which can lead to stress cracks in the finished parts. The absence of such coating material constituents in the method leads, consequently, to an increased yield, which ultimately, in turn, harbours a positive economic and also environmentally friendly effect.

Component A:

Compounds contemplated as component A include one or more monomeric or polymeric compounds which carry at least two functional groups that react by exposure to actinic radiation with ethylenically unsaturated compounds, with polymerization, and which contain no isocyanate groups.

Compounds of this kind are, for example, esters, carbonates, acrylates, ethers, urethanes or amides or polymeric compounds of these structural types. Use may also be made of any desired mixtures of such monomers and/or polymers which contain at least two groups which are polymerizable on exposure to actinic radiation.

As compounds of component A it is possible to use modified monomers or polymers, whose modification takes place in accordance with techniques that are known per se. In the course of the modification, corresponding chemical functionalities are inserted into the molecules. Suitability is possessed by $\alpha,\beta$-unsaturated carboxylic acid derivatives such as acrylates, methacrylates, maleates, fumarates, maleimides, acrylamides, and also vinyl ethers, propenyl ethers, allyl ethers, and compounds containing dicyclopentadienyl units. Preference is given to vinyl ethers, acrylates and methacrylates, particular preference to acrylates.

Examples include the binders that are known in radiation curing technology, such as polyether acrylates, polyester acrylates, urethane acrylates, epoxy acrylates, melamine acrylates, silicone acrylates, polycarbonate acrylates and acrylated polyacrylates.

Suitable esters are usually obtained by esterifying alcohols having 2 to 20 carbon atoms, preferably polyhydric alcohols having 2 to 20 carbon atoms, with unsaturated acids or unsaturated acid chlorides, preferably acrylic acid and its derivatives. For this purpose it is possible to employ the esterification techniques known to a person skilled in the art.

Suitable alcohol components in the esterification are monohydric alcohols such as the isomeric butanols, pentanols, hexanols, heptanols, octanols, nonanols and decanols, and also cycloaliphatic alcohols such as isobornol, cyclohexanol and alkylated cyclohexanols, dicyclopentanol, arylaliphatic alcohols such as phenoxyethanol and nonylphenylethanol, and also tetrahydrofurfuryl alcohols. Likewise suitable are dihydric alcohols such as ethylene glycol, propane-1,2-diol, propane-1,3-diol, diethylene glycol, dipropylene glycol, the isomeric butanediols, neopentyl glycol, hexane-1,6-diol, 2-ethylhexanediol, 1,4-cyclohexanediol, 1,4-cyclohexanedimethanol and tripropylene glycol. Suitable higher polyhydric alcohols are glycerol, trimethylolpropane, ditrimethylolpropane, pentaerythritol or dipentaerythritol. Preference is given to diols and higher polyhydric alcohols, and particular preference to glycerol, trimethylolpropane, pentaerythritol, dipentaerythritol and 1,4-cyclohexanedimethanol.

Suitable esters, and urethanes, are also obtainable, for example, by reaction of unsaturated OH-functional, unsaturated compounds having 2 to 12, preferably 2 to 4, carbon atoms, and also, optionally, aforementioned alcohol components, with acids, esters, acid anhydrides or acid chlorides, and isocyanates, respectively.

Suitable hydroxy-functional acrylates or methacrylates include, for example, compounds such as 2-hydroxyethyl (meth)acrylate, polyethylene oxide mono(meth)acrylates, polypropylene oxide mono(meth)acrylates, polyalkylene oxide mono(meth)acrylates, poly(s-caprolactone)mono (meth)acrylates, such as, for example, Tone® M100 (Dow, Schwalbach, DE), 2-hydroxypropyl(meth)acrylate, 4-hydroxybutyl(meth)acrylate, 3-hydroxy-2,2-dimethylpropyl (meth)acrylate, the hydroxy-functional mono-, di- or tetraacrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or technical mixtures thereof.

Examples of preferred unsaturated OH-functional compounds are hydroxyethyl(meth)acrylate, 2- and 3-hydroxypropyl(meth)acrylate, 2-, 3- and 4-hydroxybutyl(meth) acrylate, and also OH-functional vinyl ethers, such as hydroxy butyl vinyl ether, for example, and also mixtures thereof.

As OH-functional unsaturated compounds it is further possible to employ OH-functional (meth)acrylic esters and amides, which are obtainable by reaction of up to n−1 equivalents of (meth)acrylic acid with n-hydric alcohols, amines, amino alcohols and/or mixtures thereof n-Hydric alcohols contemplated in this context include glycerol, trimethylolpropane and/or pentaerythritol.

Likewise it is possible to use products from the reaction of epoxy-functional (meth)acrylic esters with (meth)acrylic acid. For instance, the reaction of glycidyl methacrylate with acrylic acid produces a mixed acrylic/methacrylic ester of glycerol, which can be used with particular advantage.

For the preparation of urethanes from these OH-functional unsaturated compounds it is possible to use mono-, di- or polyisocyanates. Suitability for this purpose is possessed by isomeric butyl isocyanates, butylene diisocyanate, hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or their mixtures of any desired isomer content, isocyanatomethyloctane 1,8-diisocyanate, 1,4-cyclohexylene diisocyanate, the isomeric cyclohexanedimethylene diisocyanates, 1,4-phenylene diisocyanate, 2,4- and/or 2,6-tolylene diisocyanate, 1,5-naphthylene diisocyanate, 2,4'- or 4,4'-diphenylmethane diisocyanate, triphenylmethane 4,4',4"-triisocyanate or derivatives thereof with urethane, urea, carbodiimide, acylurea, isocyanurate, allophanate, biuret, oxadiazinetrione, uretdione or iminooxadiazinedione structure, and mixtures thereof.

Preferred polyisocyanates are those based on oligomerized and/or derivatized diisocyanates that have been freed from excess diisocyanate by suitable methods, especially those of hexamethylene diisocyanate, isophorone diisocyanate and of the isomeric bis(4,4'-isocyanatocyclohexyl)methanes, and also mixtures thereof. Preference is given to the oligomeric isocyanurates, uretdiones, allophanates and iminooxadiazinediones of HDI, the oligomeric isocyanurates, uretdiones and allophanates of IPDI, and the oligomeric isocyanurates of the isomeric bis(4,4'-isocyanatocyclohexyl)methanes, and also mixtures thereof.

In analogy to the description above, suitable polyesters, polycarbonates or polyurethanes are obtainable, for example, by reaction of unsaturated OH-functional compounds having 2 to 12, preferably 2 to 4, carbon atoms with, for example, acid-, ester- or acid-chloride-functional polyesters or polycarbonates or NCO-functional polyurethanes, respectively.

Also suitable are reaction products of polyesters having acid numbers >5 and glycidyl-functional (meth)acrylates (e.g. glycidyl methacrylate).

Preferred OH-functional unsaturated compounds for the synthesis of unsaturated polyesters, polycarbonates and polyurethanes are hydroxyethyl acrylate and the isomeric hydroxypropyl acrylates. A particularly preferred reaction product is that of glycidyl methacrylate and acrylic acid.

Polyacrylates can be given a radiation-curing modification only after the polymerization of the acrylate monomers and vinylaromatic monomers. This modification takes place via functional groups which are inert in respect of the conditions under which the polyacrylate is prepared, and which only thereafter are further modified to give unsaturated, radiation-curing groups.

Suitable groups for this purpose are, for example, those set out in the table below:

| Inert group | Modifying reagent | Radiation-curing group |
|---|---|---|
| Epoxy | Acrylic acid, dimeric acrylic acid | Acrylate |
| Acid | Glycidyl methacrylate | Methacrylate |
| Acid | Hydroxyalkyl acrylate | Acrylate |
| Alcohol | Maleic anhydride | Maleate |
| Alcohol | Acrylic acid, dimeric acrylic acid | Acrylate |
| Alcohol | Acrylo-functional isocyanate | Urethane acrylate |
| Isocyanate | Hydroxyalkyl acrylate | Urethane acrylate |
| Anhydride | Hydroxyalkyl acrylate | Acrylate |

Among the polyacrylates, preference is given to the diacrylates such as hexanediol diacrylate.

From the above-stated compounds, the starting compounds for preparing the compounds of component A are to be selected in each case such that the resultant compounds possess a molar mass of more than 450 g/mol and in each case carry at least two functional groups that react by exposure to actinic radiation with ethylenically unsaturated compounds, with polymerization, and contain no isocyanate groups.

It is preferred to use urethane acrylates, prepared from aforementioned hydroxyalkyl acrylates, diols and/or polyols and aliphatic diisocyanates and/or polyisocyanates which have at least one allophanate groups, HDI trimer group, biuret group, uretdione group and/or isocyanurate group in the molecule. Particularly preferred urethane acrylates used are those based on HDI trimers, as present, for example, in Desmolux® U680H from Bayer MaterialScience AG, and also urethane acrylates based on allophanates, as present, for example, in Desmolux® XP 2666 from Bayer MaterialScience AG.

Component B

The preparation and use of suitable reactive diluents as per component B are known and are described for example in Chemistry & Technology of UV & EB Formulation for Coatings, Inks & Paints, vol. 2, 1991, SITA Technology, London (P.K.T: Oldring (ed.)) on pp. 237-306 (Reactive Diluents) and also in Römpp Lexikon Chemie, p. 491, 10$^{th}$ edn. 1998, Georg-Thieme-Verlag, Stuttgart. Suitable here for the purposes of the invention are, for example, methanediol diacrylate, 1,2-ethanediol diacrylate, 1,3-propanediol diacrylate, 1,2-propanediol diacrylate, glycerol triacrylate, 1,4-butanediol diacrylate, 1,3-butanediol diacrylate, 1,2,4-butanetriol triacrylate, 1,5-pentanediol diacrylate, neopentylglycol diacrylate, pentaerythritol triacrylate, pentaerythritol tetraacrylate, 1,6-hexanediol diacrylate, trimethylolpropane diacrylate, trimethylolpropane triacrylate, tricyclodecanedimethanol diacrylate, diethylene glycol diacrylate, triethylene glycol diacrylate, tetraethylene glycol diacrylate, dipropylene glycol diacrylate, tripropylene glycol diacrylate, trimethylolpropane triethoxytriacrylate, dipentaerythritol pentaacrylate, dipentaerythritol hexaacrylate, ditrimethylolpropane tetraacrylate and the corresponding methacrylate derivatives, and/or mixtures thereof.

It is preferred to use 1,6-hexanediol diacrylate, tricyclodecanedimethanol diacrylate, trimethylolpropane triacrylate, pentaerythritol tetraacrylate and their methacrylate derivatives and/or mixtures of the aforementioned reactive diluents.

Particular preference is given to using 1,6-hexanediol diacrylate.

Component C:

Starting compounds used for preparing component C are aromatic, araliphatic, aliphatic and cycloaliphatic di- or polyisocyanates. Mixtures of such di- or polyisocyanates may also be used. Examples of suitable di- or polyisocyanates are butylene diisocyanate, hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or their mixtures of any desired isomer content, isocyanatomethyloctane 1,8-diisocyanate, 1,4-cyclohexylene diisocyanate, the isomeric cyclohexanedimethylene diisocyanates, 1,4-phenylene diisocyanate, 2,4- and/or 2,6-tolylene diisocyanate, 1,5-naphthylene diisocyanate, 2,4'- or 4,4'-diphenylmethane diisocyanate, triphenylmethane 4,4',4"-triisocyanate or derivatives thereof with urethane, urea, carbodiimide, acylurea, isocyanurate, allophanate, biuret, oxadiazinetrione, uretdione or iminooxadiazinedione structure, and mixtures thereof. Preferred polyisocyanates are those based on oligomerized and/or derivatized diisocyanates that have been freed from excess diisocyanate by suitable methods, especially those of hexamethylene diisocyanate, isophorone diisocyanate and of the isomeric bis(4,4'-isocyanatocyclohexyl)methanes, and also mixtures thereof. Preference is given to the oligomeric isocyanurates, uretdiones, allophanates and iminooxadiazinediones of HDI, of IPDI and/or of the isomeric bis(4,4'-isocyanatocyclohexyl)methanes, and also mixtures thereof. Particular preference is given to the oligomeric isocyanurates, uretdiones and allophanates of IPDI, and the oligomeric isocyanurates of the isomeric bis(4,4'-isocyanatocyclohexyl) methanes.

Where the abovementioned isocyanates contain no isocyanate-reactive, ethylenically unsaturated functionalities, they must be used in a form in which they are reacted wholly or partly with isocyanate-reactive ethylenically unsaturated compounds. For this purpose it is preferred to use α,β-unsaturated carboxylic acid derivatives such as acrylates, methacrylates, maleates, fumarates, maleimides, acrylamides, and also vinyl ethers, propenyl ethers, allyl ethers and compounds containing dicyclopentadienyl units and having at least one isocyanate-reactive group; particularly preferred here are acrylates and methacrylates having at least one isocyanate-reactive group. Examples of suitable hydroxy-functional acrylates or methacrylates include compounds such as 2-hydroxyethyl(meth)acrylate, polyethylene oxide mono (meth)acrylates, polypropylene oxide mono(meth)acrylates, polyalkylene oxide mono(meth)acrylates, poly("epsilon"-caprolactone)mono(meth)acrylates, such as, for example, Tone® M100 (Dow, USA), 2-hydroxypropyl(meth)acrylate, 4-hydroxybutyl(meth)acrylate, 3-hydroxy-2,2-dimethylpropyl(meth)acrylate, the hydroxy-functional mono-, di- or tetra (meth)acrylates of polyhydric alcohols such as trimethylolpropane, glycerol, pentaerythritol, dipentaerythritol, ethoxylated, propoxylated or alkoxylated trimethylolpropane, glycerol, pentaerythritol, dipentaerythritol or their technical mixtures. Also suitable are isocyanate-reactive oligomeric or polymeric unsaturated compounds containing acrylate and/or methacrylate groups, alone or in combination with the aforementioned monomeric compounds.

It may also be possible to use the aforementioned isocyanates or reactive isocyanates in a form in which they have been reacted partly with blocking agents known to a person skilled in the art from coatings technology. Examples of blocking agents include the following: alcohols, lactams, oximes, malonic esters, alkyl acetoacetates, triazoles, phenols, imidazoles, pyrazoles, and also amines, such as butanone oxime, diisopropylamine, 1,2,4-triazole, dimethyl-1,2,4-triazole, imidazole, diethyl malonate, ethyl acetoacetate, acetone oxime, 3,5-dimethylpyrazole, epsilon-caprolactam, N-tert-butylbenzylamine, cyclopentanone carboxyethyl ester, for example, or any desired mixtures of these blocking agents.

As compounds of component C it is possible to use all aforementioned compounds and the reaction products of the aforementioned compounds, individually or in any desired mixtures, with the proviso that they contain at least one isocyanate group and also at least one ethylenically unsaturated function which reacts on exposure to actinic radiation with ethylenically unsaturated compounds, with polymerization.

Preference is given to using acrylates containing isocyanate groups, such as Desmolux® D100 (Bayer MaterialScience AG) or Laromer® LR9000 (BASF SE).

Component D:

The use of light stabilizers and the various types are described by way of example in A. Valet, Lichtschutzmittel für Lacke, Vincentz Verlag, Hanover, 1996.

Preferred light stabilizers for the purposes of the invention are derivatives of triazine, preferably derivatives of biphenyltriazine. It is particularly preferred to use light stabilizers according to the following formula (I),

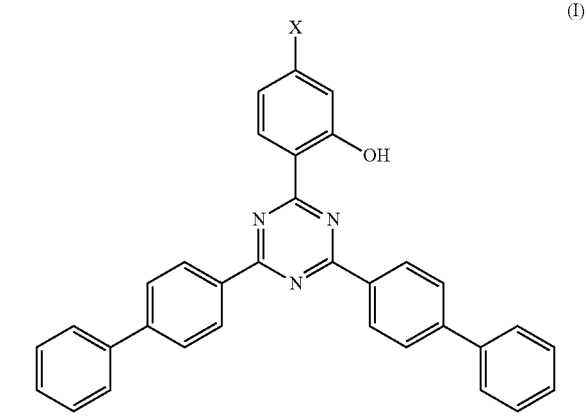

(I)

where
X=OR6, OCH2CH2OR6, OCH2CH(OH)CH2OR6 or OCH(R7)COOR8, preferably OCH(R7)COOR8, R6=branched or unbranched C1-C13-alkyl, C2-C20-alkenyl, C6-C12-aryl or —CO—C1-C18-alkyl, R7=H or branched or unbranched C1-C8-alkyl, preferably CH3, and R8=C1-C12-alkyl; C2-C12-alkenyl or C5-C6-cycloalkyl, preferably C8H17.

Particularly preferred for use as component D is a light stabilizer of the formula (I) with X=OCH(R7)COOR8, R7=CH3 and R8=C8H17 (UV absorber CGL479 from Ciba Speciality Chemicals).

The biphenyl-substituted triazines of the general formula (I) are known in principle from WO-A 96/28431; DE-A 197 39 797; WO-A 00/66675; U.S. Pat. No. 6,225,384; U.S. Pat. No. 6,255,483; EP-A 1 308 084 and DE-A 101 35 795.

In one preferred embodiment the light stabilizers exhibit high UV absorption in the range of the greatest sensitivity of the substrate layer; with particular preference the light stabilizers possess a UV absorption maximum between 300-340 nm.

Additionally it is possible to use all suitable organic light stabilizers, examples being benzophenones, benzotriazoles, oxalanilides, cyanoacrylates, and the derivatives of the aforementioned light stabilizers, and mixtures of all aforementioned light stabilizers, in any desired proportion. Examples of commercially available UV absorbers include. Sanduvor 3206 (Clariant AG), and Tinuvin 400, Tinuvin 405 and Tinuvin 479 (Ciba AG).

The amount for addition should be selected so as to maximize the absorbance in the region of the UV absorption maximum between 300-340 nm. Preferred amounts of component D for addition are in the range between 0.01% and 10.0%, more preferably 0.1% to 7.0% and very preferably in the range between 0.2% and 5.0%.

Component E:

Photoinitiators are initiators which can be activated by actinic radiation and which trigger free-radical polymerization of the corresponding polymerizable groups. Use may be made of customary, commercially available photoinitiators, a distinction being drawn between unimolecular (type I) and bimolecular (type H) initiators. Type I systems are, for example, aromatic ketone compounds, such as benzophenones, in combination with tertiary amines, alkylbenzophenones, 4,4'-bis(dimethylamino)-benzophenone (Michler's ketone), anthrone and halogenated benzophenones or mixtures of the stated types. Additionally suitable are type II initiators such as benzoin and its derivatives, benzil ketals, acylphosphine oxides, e.g. 2,4,6-trimethylbenzoyldiphenylphosphine oxide, bisacylphosphine oxides, phenylglyoxylic esters, camphorquinone, α-aminoalkylphenones, α,α-dialkoxyacetophenones and α-hydroxyalkylphenones. Depending on the radiation source used for curing, the type and concentration of photoinitiator must be adapted, in a manner known to a person skilled in the art, and in this context it may also be advantageous to employ mixtures of these compounds. Further details are described for example in P.K.T. Oldring (ed.), Chemistry & Technology of UV & EB Formulations For Coatings, Inks & Paints, vol. 3, 1991, SITA Technology, London, pp. 61-328. Suitable initiators are commercially available, for example, under the name Irgacure® and Darocur® (Ciba, Basel, C H) and also Esacure® (Fratelli Lamberti, Adelate, I T) and Lucirin® (BASF, Germany).

Preference is given to using 1-hydroxycyclohexyl phenyl ketone (Irgacure® 184 from Ciba, Basel, C H) and ethyl 2,4,6-trimethylbenzoylphenylphospinate (Lucirin® TPO-L from BASF AG) in any desired proportion and in a total amount of 1%-10% by weight.

Component F:

Present as component F may be auxiliaries or adjuvants that are customary in the technology of paints, varnishes, printing inks, sealants and adhesives.

These are more particularly stabilizers such as sterically hindered amines (HALS), and also antioxidants, and also paint auxiliaries, examples being anti-settling agents, defoamers and/or wetting agents, flow control agents, plasticizers, catalysts, auxiliary solvents and/or thickeners, and also pigments, dyes and/or matting agents.

Additionally present as component F may be unfunctional polymers and fillers for adjusting the mechanical and optical properties. Suitable for this purpose are all polymers and fillers which are miscible and compatible with the coating material. The compounds of component F may be used not only in the form of bulk material but also in the form of particles having average diameters in the range between one and 10 000 nanometers, preferably in the range from one to 500 nanometers, more preferably in the range from two to 200 nanometers.

Suitable polymeric additives include polymers such as, for example, polyacrylates, polycarbonates, polyurethanes, polyolefins, polyethers, polyesters, polyamides and polyureas.

Fillers which can be used include mineral fillers, glass fibres and/or metallic fillers, of the kind employed in common formulas for what are called metallic finishes.

Thermoplastic Substrate/Thermoplastic Substrate Layers:

Plastics contemplated for the matrix of the substrate layer or substrate layers of the moulding include all transparent thermoplastics: polyacrylates, poly(meth)acrylates (e.g. PMMA; e.g. Plexiglas® from Röhm), cycloolefin copolymers (COC; e.g. Topas® from Ticona; Zenoex® from Nippon Zeon or Apel® from Japan Synthetic Rubber), polysulphones (Ultrason@ from BASF or Udel® from Solvay), polyesters, such as PET or PEN, polycarbonate (PC), polycarbonate/polyester blends, e.g. PC/PET, polycarbonate/polycyclohexylmethanolcyclohexanedicarboxylate (PCCD; Xylex® from Sabic Innovative Plastics), polycarbonate/PBT, and mixtures thereof.

It is preferred to use poly(meth)acrylates and also polycarbonates, and more particularly use is made of polycarbonates and mixtures thereof.

Suitable polycarbonates for producing the plastics composition of the invention are all known polycarbonates. These are homopolycarbonates, copolycarbonates and thermoplastic polyestercarbonates.

The polycarbonates that are suitable preferably have average molecular weights $\overline{M}_w$ of 18 000 to 40 000, preferably of 26 000 to 36 000 and more particularly of 28 000 to 35 000, as determined by measuring the relative solution viscosity in dichloro-methane or in mixtures of equal amounts by weight of phenol/o-dichlorobenzene, calibrated by light scattering.

The polycarbonates are prepared preferably by the phase interface process or the melt transesterification process, which are described copiously in the literature. With regard to the phase interface process, reference may be made, for example, to H. Schnell, Chemistry and Physics of Polycarbonates, Polymer Reviews, Vol. 9, Interscience Publishers, New York 1964 p. 33 ff., to Polymer Reviews, Vol. 10, "Condensation Polymers by Interfacial and Solution Methods", Paul W. Morgan, Interscience Publishers, New York 1965, Chapter VIII, p. 325, to Dres. U. Grigo, K. Kircher and P. R Müller "Polycarbonate" in Becker/Braun, Kunststoff-Handbuch, Volume 3/1, Polycarbonate, Polyacetale, Polyester, Celluloseester, Carl Hanser Verlag, Munich, Vienna 1992, pp. 118-145, and also to EP-A 0 517 044.

The melt transesterification process is described in, for example, the Encyclopaedia of Polymer Science, Vol. 10 (1969), Chemistry and Physics of Polycarbonates, Polymer Reviews, H. Schnell, Vol. 9, John Wiley and Sons, Inc. (1964) and also in patents DE-B 10 31 512 and U.S. Pat. No. 6,228, 973.

The polycarbonates are obtained from reactions of bisphenol compounds with carbonic acid compounds, more particularly phosgene or, in the case of the melt transesterification process, diphenyl carbonate or dimethyl carbonate. Particularly preferred in this context are homopolycarbonates based on bisphenol A and copolycarbonates based on the monomers bisphenol A and 1,1-bis(4-hydroxy-phenyl)-3,3,5-trimethyl-cyclohexane. Other bisphenol compounds which can be used for polycarbonate synthesis include those disclosed in WO-A 2008037364, EP-A 1 582 549, WO-A 2002026862, WO-A 2005113639.

The polycarbonates may be linear or branched. It is also possible for mixtures of branched and unbranched polycarbonates to be used.

Suitable branching agents for polycarbonates are known from the literature and described in, for example, U.S. Pat. No. 4,185,009, DE-A 25 00 092, DE-A 42 40 313, DE-A 19 943 642, U.S. Pat. No. 5,367,044, and in literature cited therein. Furthermore, the polycarbonates used may also be intrinsically branched, in which case no branching agent is added at the polycarbonate preparation stage. An example of intrinsic branches are what are called Fries structures, of the kind disclosed for melt polycarbonates in EP-A 1 506 249.

At the polycarbonate preparation stage it is additionally possible to use chain terminators. Chain terminators used are preferably phenols such as phenol, alkylphenols such as cresol and 4-tert-butylphenol, chlorophenol, bromophenol, cumylphenol or mixtures thereof.

The plastics composition(s) of the substrate layer or substrate layers may further comprise additives, such as UV absorbers, IR absorbers, and other customary processing assistants, more particularly demoulding agents and flow agents, and also the customary stabilizers, more particularly heat stabilizers, and also antistats, pigments, colorants and optical brighteners, for example. In each layer there may be different additives and/or concentrations of additives present.

In one preferred embodiment the plastic used comprises polycarbonate which additionally contains 0.01% to 0.5% by weight of one or more UV absorbers from the classes of benzotriazole derivatives, dimeric benzotriazole derivatives, triazine derivatives, dimeric triazine derivatives, and diaryl cyanoacrylates.

In one embodiment there are larger amounts of additives, especially of UV absorbers, present in other substrate layers, as for example in any coextrusion layer(s) present.

Production of the Substrate:

The plastics compositions of the invention, comprising the thermoplastic and, where used, further additives, may be processed to the substrate comprising the substrate layers by injection moulding or by extrusion.

Where the substrate involves sheets of large surface area, it cannot be produced economically by injection moulding, for technical reasons. In these cases, the extrusion process is preferable. For extrusion, the thermoplastic pellets are supplied to the extruder and melted in the plastifying system of the extruder. The plastics melt is pressed through a slot die, and shaped in the process, brought into its desired final shape in the roll nip of a polishing calender, and shape-set by alternate cooling on polishing rolls and the ambient air. The temperatures set are those needed for the extrusion of the thermoplastic in question; normally, the manufacturer's specifications can be followed. The polycarbonates used for extrusion, with a high melt viscosity, are processed, for example, normally at melt temperatures of 260 to 320° C.; the temperatures of the plastifying barrel and also the die temperatures are set accordingly.

Coextrusion

By using one or more side extruders and a multi-channel die, or, if appropriate, suitable melt adapters ahead of a slot die, it is possible for thermoplastic melts of different composition to be laid over one another, and hence for multi-layer sheets or films to be produced (for coextrusion see, for example, EP-A 0 110 221, EP-A 0 110 238 and EP-A 0 716 919; for details of the adapter process and die process, see Johannaber/Ast: "Kunststoff-Maschinenführer", Hanser Verlag, 2000, and in Gesellschaft Kunststofftechnik: "Koextrudierte Folien und Platten: Zukunftsperspektiven, Anforderungen, Anlagen und Herstellung, Qualitätssicherung", VDI-Verlag, 1990).

For the coextrusion it is preferred to use polycarbonates and poly(meth)acrylates. Particular preference is given to using polycarbonates.

Production of the Coating Material:

The coating material compositions are produced by methods that are known to the person skilled in the art. An overview of common production methods is found, for example, in Lehrbuch der Lacktechnologie (Brock, Groteklaes, Mischke—Vincentz Verlag, $2^{nd}$ edition 2000, page 229ff.) or in Lehrbuch der Lacke und Beschichtungsstoffe, Volume 8—Herstellung von Lacken und Beschichtungsstoffen (Kittel, Hirzel Verlag, $2^{nd}$ edition 2005).

The most common mode of production is that involving stirring. In this case, all of the components are introduced in succession into a vessel, and are homogenized with continuous stirring. In order to accelerate the homogenizing process, the mixtures may be heated.

Application:

The solvent-free coating material compositions are applied in-line directly after the thermoplastic moulding has been produced. In principle it is possible to employ any common techniques for applying coating materials to substrates, such as spraying, flowcoating, pouring, knifecoating or rolling. Preference is given to knifecoating, pouring and rolling, particular preference to knifecoating and rolling, and especial preference to rolling.

In the case of rolling or roll application, the coating material is put onto the substrate via one or more rolls. The resulting surface quality can be influenced via the choice of roll material and of roll surface structure. Rolls may be run in the same direction or else opposite to the conveyed path of the moulding. The application rate of the coating material to the moulding is regulated via pumping rates and also by way of the roll nips used. Moreover, the rotational speeds of the applicator roll and the pick-up roll, and also the ratio of the rotational speeds to one another, have an influence on the resulting application rate.

An overview of the various application methods using rolls, taking coil coating as its example, is given by the book "Coil Coating—Bandbeschichtung: Verfahren, Produkte und Märkte" (Meuthen, Jandel—Vieweg Verlag, $2^{nd}$ edition, 2007, p. 115ff.). The roll coating application systems described therein can in principle be transposed to flat substrates made of wood or plastic.

Drying and Adhesion:

The coating material applied beforehand now forms a homogeneous, as yet uncured protective layer on the substrate. Depending on the constituents of the coating material and on their amounts, low-viscosity constituents, such as components B, penetrate to the upper boundary layer of the substrate and form what is called an interpenetration layer (IPL).

The substrate temperatures prior to the application of the coating material ought preferably to be 60-90° C., more preferably 75-85° C., and ought not to exceed 90° C. The coating materials in the course of the process ought to have a temperature of around 40° C. As a result of the continuous supplying of the coating material to the applicator assembly, and as a result of the circulation of the excess material, the temperature of around 40° C. is reached after a short time. A temperature range of about 30-50° C. has turned out to be preferential with regard to the handling of the composition and the quality of the surface of the protective layer. Depending on the precise composition of the coating material, the temperature range optimum for application may vary within limits. Without further heating, the coated moulding cools down in a short time after the application step. Preferably, however, the coated moulding continues to be heated until curing is at an end. For this, preferably, the temperature of the coated moulding ought to between 40 and 90° C., more preferably between 60 and 80° C. and very preferably between 70 and 80° C. Appropriate for heating are fixed, continuous forced-air ovens or IR fields for the heating of the coated moulding.

The extrusion rate, which is a measure of the residence time, must then be adapted such that, overall, adhesion is sufficient. The extrusion rate is preferably 1-7 m/min, more preferably 1-4 m/min, most preferably 1-2.5 m/min. A corresponding criterion of adhesion may follow the lines of ASTM D3359 and have its basis in a complete absence of delamination of the coating after cross-hatching with subsequent tape removal. Another, more stringent criterion of adhesion would be no delamination at all following storage of the coating, tested beforehand, in boiling water for 2 to 4 hours after the repetition of tape removal.

Following the residence time, the coating material is cured on the moulding.

Curing:

Curing with actinic radiation is understood to involve the free-radical polymerization of ethylenically unsaturated carbon-carbon double bonds by means of free initiator radicals which are released from the above-described photoinitiators, for example, as a result of exposure to actinic radiation. "Actinic" here means the capacity of radiation to bring about chemical modification of certain compounds.

Actinic radiation is preferably high-energy UV radiation or daylight, e.g. light with a wavelength of 200 to 750 nm, or high-energy electron irradiation (electron beams, 90 to 300 keV). Radiation sources of light or UV light that are used include, for example, medium-pressure or high-pressure mercury vapour lamps, in which the mercury vapour may be modified by doping with other elements such as gallium or iron. Lasers, pulsed lamps (referred to as UV flash light lamps), halogen lamps or excimer emitters can likewise be employed. The lamps may be installed stationarily, and so the material for irradiation is conveyed past the radiation source by means of a mechanical device, or the lamps may be mobile, and the material to be irradiated does not change its position in the course of curing. The radiation dose normally sufficient for crosslinking the case of UV curing is situated in the range from 80 to 5000 mJ/cm$^2$.

Irradiation may optionally also be carried out in the absence of oxygen, as for example under an inert gas atmosphere or oxygen-reduced atmosphere. Suitable inert gases are preferably nitrogen, carbon dioxide, noble gases or combustion gases. Furthermore, irradiation may take place with the coating covered by media that are transparent for the radiation. Examples thereof are polymeric films, glass or liquids such as water, for example.

Depending on the radiation dose and curing conditions, the type and concentration of any initiator used may be varied and optimized in a way which is known to a person skilled in the art (a corresponding overview is given by the book "Strahlenhärtung" by Peter G. Garratt, Vincentz Verlag, 1996), or by means of preliminary, range-finding tests. For the curing of shaped films it is particularly advantageous to carry out curing with two or more lamps, their arrangement selected such that each point on the coating receives, as far as possible, the optimum radiation dose and intensity for curing. In particular, unirradiated areas (shadow zones) should be prevented.

Moreover, depending on the moulding employed, it may be advantageous to choose the irradiation conditions such that the thermal load on the moulding does not become too great. Thin mouldings in particular, and also mouldings made of materials having a low glass transition temperature, exhibit a tendency towards uncontrolled deformation if irradiation causes a particular temperature to be exceeded. In these cases it is advantageous, using suitable filters or a suitable lamp construction, to cause as little infrared radiation as possible to act on the substrate. Moreover, the uncontrolled deformation can be countered by reducing the radiation dose in question. In that case, however, it must be borne in mind that, for complete or near-complete polymerization, a particular dose and intensity of irradiation are needed. In these cases it is particularly advantageous to carry out curing under inert or oxygen-reduced conditions, since reducing the oxygen fraction in the atmosphere above the coating lowers the dose required for full curing.

For curing, it is particularly preferred to use mercury lamps in stationary units. Photoinitiators are then used at concentrations of 1% to 10% by weight, based on the solids of the coating.

The coatings of the invention, comprising one or more of the photoinitiators listed under component E, are cured preferably with a radiation dose of 500 to 4000 mJ/cm$^2$, as measured in the wavelength range from 200 to 600 nm. During irradiation, the substrate temperature should not exceed 90° C.

Functional Layers

On one side of the moulding, optionally, there may be what is called a water-spreading layer applied, which spreads adherent water, especially adherent water drops, thereby maintaining visibility through the surface-modified moulding.

Water-spreading layers and their production are described in, for example, DE-A 19829165 or WO 2009/010193 A.

The multi-layer product may also comprise further layers. Further coatings contemplated include, for example, IR-absorbing layers, IR-reflecting layers, UV-absorbing layers, electrically conductive layers, electroluminescent layers, ink layers and print layers for decorative purposes, electrically conductive print layers, as used, for example, for heating car windows, anti-reflection layers, no-drop coatings, anti-fog coatings, anti-fingerprint coatings, coatings to counter growth of algae, fungi and moss, coatings offering an easy-to-clean effect, self-cleaning effect, anti-graffiti effect, dust and dirt repellency effect or specific tactile effect, and/or combinations thereof. These coatings may be present or applied as interlayers and/or outer layers.

Applications

The products according to the invention are films, sheets, such as solid sheets or sandwich sheets, for example, produced by extrusion with subsequent coating. Applications of the products are found in the fields of architectural glazing, especially roofing systems and glazing systems for swimming pools, carports, greenhouses, industrial complexes and private dwellings, motor vehicle glazing, and noise and sight screens. Preferred products which may be obtained in accordance with the method of the invention include the sandwich sheet with preferably 2 to 8, in particular 2 to 4 struts which are used in particular for use in roofs, in the plane or curved form (for example as barrel vaults). The sandwich sheet can either be bent as a whole sheet or be bent at one or both ends of the sheet.

EXAMPLES

Raw materials and other materials used were as follows:

| Raw material used | Type | Manufacturer |
|---|---|---|
| Desmolux ® D 100 | Isocyanate-containing urethane acrylate | Bayer MaterialScience AG |
| Desmolux ® XP 2666 | Allophanate-based urethane acrylate | Bayer MaterialScience AG |
| Desmolux ® U680H | HDI trimer-based urethane acrylate | Bayer MaterialScience AG |
| 1,6-Hexanediol diacrylate | 1,6-Hexanediol diacrylate | Aldrich |
| Irgacure 184 | 1-Hydroxycyclohexyl phenyl ketone | Ciba AG |
| Lucirin TPO-L | Ethyl 2,4,6-trimethyl-benzoylphenylphosphinate | BASF SE |
| Sanduvor 3206 | Oxalanilide derivative, CAS No. 82493-14-9 | Clariant AG |
| Sanduvor 3058 | Sterically hindered amine | Clariant AG |
| Tinuvin 479 | Biphenyltriazine derivative | Ciba AG |
| BYK 302 | Polyether-modified polydimethylsiloxane | BYK |
| BYK 306 | Polyether-modified polydimethylsiloxane | BYK |
| Lexan ® Themoclear Plus 2 UV (twin-web sandwich panel) | Double-sidedly coated twin-web polycarbonate sandwich panel | Sabic Innovative Plastics |
| Makrolon ® Multi UV no drop (twin-web sandwich panel) | Single-sidedly coated twin-web polycarbonate sandwich panel | Bayer Sheet Europe |

Example 1 (Inventive)

a) Production of the Coating Composition

A stirring vessel with stirrer and stirring assembly was first charged with 35.3 parts of 1,6-hexanediol diacrylate. Thereafter, at 500 rpm, in succession, 2.8 parts of Irgacure 184, 1.0 part of Sanduvor 3058, 1.0 part of Sanduvor 3206 and 0.9 part of BYK 306 were added in succession, with stirring until each additive had dissolved homogeneously. This was followed by stirring for 5 minutes.

Then 57.8 parts of the Desmolux® U 680 H were added to the additive solution, with continuous stirring, and the formulation was homogenized for a further 10 minutes. The viscosity of the coating material at room temperature was approximately 2500 mPas.

b) Production of the Substrate by Extrusion

A twin-web sandwich panel 16 mm thick and 1 m wide, provided with a coextrusion layer on one side, was obtained from the following composition:

The base material used was a mixture of equal proportions of Makrolon® 1243 (branched bisphenol A polycarbonate from Bayer AG, Leverkusen, having a melt flow index (MFR) to ISO 1133 of 3.25 g/10 min at 300° C. under a load of 1.2 kg) and Makrolon® 3103 (branched bisphenol A polycarbonate from Bayer AG, Leverkusen, having a melt flow index (MFR) to ISO 1133 of 6.5 g/10 min at 300° C. under a load of 1.2 kg).

This material was coextruded with a polycarbonate based on Makrolon® M3108 (linear bisphenol A polycarbonate from Bayer AG, Leverkusen, having a melt flow index (MFR) to ISO 1133 of 6.5 g/10 min at 300° C. under a load of 1.2 kg). The thickness of the coextrusion layer was approximately 50 µm.

The material of the coextrusion layer, in addition to 0.25% of pentaerythritol tetrastearate (PETS, available commercially as Loxiol® VPG 861 from Cognis, Düsseldorf, Germany), also contained a UV absorber based on a benzotriazole (2,2'-methylenebis(6-(2H-benzotriazol-2-yl)-4-[1,1,3,3]-tetramethylbutyl)phenol, available commercially from Ciba, Switzerland, as Tinuvin 360®).

The coextruded polycarbonate sandwich panels were produced using the coextrusion and coating line shown in FIG. 1.

The line was made up of the following machinery and apparatus (codes denote the corresponding line parts in FIG. 1 and FIG. 2):

1 Extrusion unit, composed of:
 a single-screw extruder (devolatilizing extruder, screw diameter 120 mm and a single screw of length 33 D, Einschnecke, Reifenhäuser, Omipa/Italy). The extruder is fitted with a vacuum melt devolatilization system.
 A two-layer coextrusion adapter (fixed adapter from Bexsol, Switzerland)
 A four-zone coextruder (screw diameter 30 mm, single screw of length 22 D, Gimat, Italy)
 A sandwich panel die with a width of 1250 mm, for sandwich panel thicknesses from 4 to 40 mm, from Bexsol, Switzerland 2—A three-part vacuum calibrator, width 1500 mm, length 3×650 mm, from Bexsol, Switzerland 3/8 Two take-off devices; the first take-off 3 (6 rolls) is located before the oven modules 4a-c and the second take-off 8 (2 rolls) is located after the coating equipment 5 (BGplast/Italy)

7 Masking unit (masking of the panel with protective film)

4a-d Four oven modules, each 2 m in length (I.G.M. Linea/Italy)

9-10 Transport and cutting to length, transverse cutter with hot knife (BGplast/Italy)

The sandwich panel with a coextrusion layer on one side was produced as follows: the polycarbonate pellets of the base material were supplied to the filling hopper of the main extruder, the coextrusion material to that of the coextruder. In the respective cylinder/screw plasticating system, each material was melted and conveyed. The two material melts were combined in the coex adapter, and formed a composite after exiting the die and cooling. The other devices were used for transport, cutting to length and laying-down of the extruded panels.

The temperature of the individual barrels of the main extruder were 240° C. to 280° C., and the resulting melt temperature was 285° C. to 295° C. The rotary speed of the melt pump was 23 rpm. The take-off speed was 1.5 m/min. The barrel temperatures of the coextruder were 245° C. to 260° C. and the resulting melt temperature was about 265° C. The rotary speed of the melt pump was 10 rpm.

c) In-Line Application of the Coating Material

Figure 2:
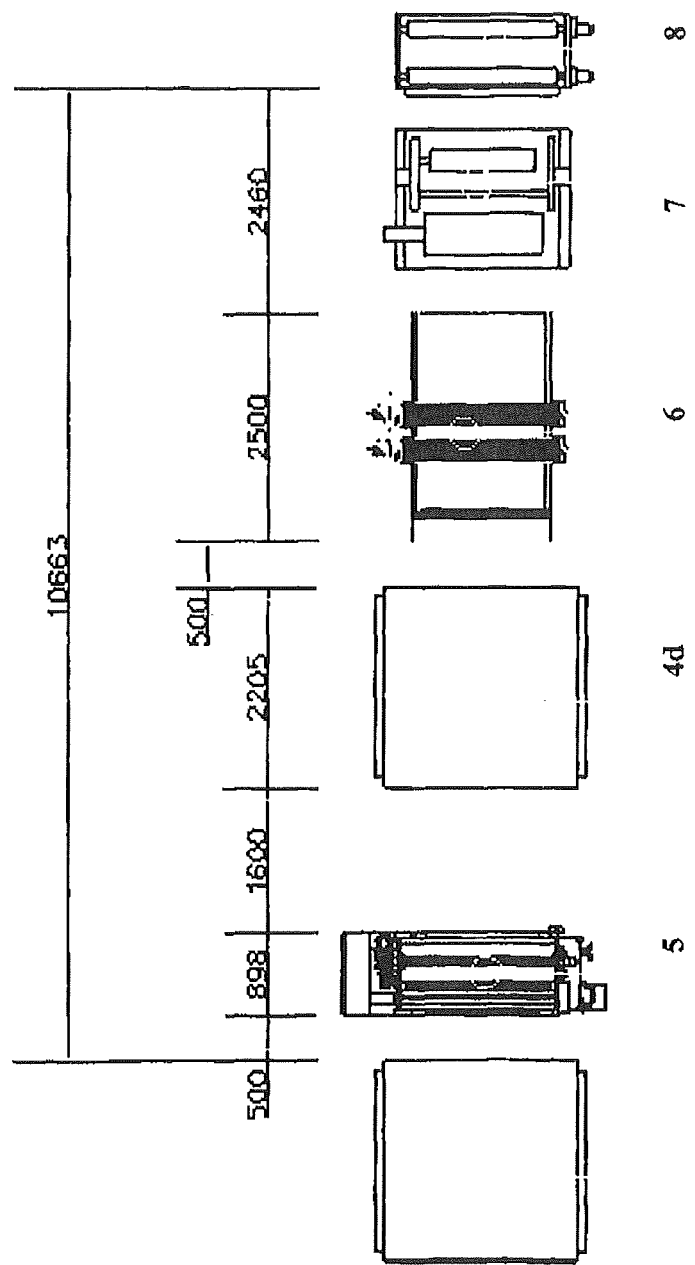
FIG. 2 illustrates a closer view of the coating part of the line of FIG. 1

In analogy to FIGS. 1 and 2, a roll applicator assembly from Sorbini was installed in-line into the extrusion line shown, after the thermal conditioning oven modules 4a-4d). The roll width of the unheated applicator roll, which was made of EPDM (ethylene-propylene-diene rubber), was 1.3 m. FIG. 2 shows the coating part of the line in detail; the dimensions entered are in mm units.

The substrate temperature of the sandwich panel, for an extrusion speed of 1.5 m/min and a temperature profile in the 3-oven zone (module 1→130° C.; module 2→120° C.; module 3→85° C.; oven length per oven→2.0 m) was around 85 to 90° C., determined using test strips from ReaTec.

With a rotational speed of 2.4 m/min for the applicator roll 5 in counter-rotation mode, and of 13.4 m/min for the metering roll, the overall coat film thickness at a coating material temperature of approximately 45° C. was 15 µm on the thermally conditioned substrate.

The distance between the applicator roll 5 and the Cefla UV tunnel 6 which had a Hg lamp output of 80 W/cm at a lamp width of 1.4 m, was 6 m. In order to maintain the temperature of the coated substrate before the forthcoming curing of the coating material on the substrate, the 2 m long oven module 4d was positioned between the roll applicator assembly and the UV tunnel, and was supplied with a target temperature of 100° C., resulting in a substrate temperature of approximately 85° C. to 90° C.

At the prevailing extrusion speed of 1.5 m/min, and with a UV curing dose of 870 mJ/cm$^2$ by means of the Hg lamp of the UV tunnel, the heated coating material on the substrate was cured to form a thermoset protective layer. The coating featured good levelling and an outstanding visual appearance.

With the test set-up otherwise unchanged, an increase in the extrusion speed to 1.9 m/min likewise resulted in flawlessly coated substrates. The increased extrusion speed reduced the available UV curing dose to 710 mJ/cm$^2$.

The adhesive strength of the coatings on the substrates was determined by means of a cross-hatch test in accordance with EN ISO 2409/ASTM D3359. An assessment was made of
  a.) the cross-hatch with and without tape removal (adhesive tape used: Scotch™ 610-1PK from 3M), and
  b.) the cross-hatch after storage in 98° C. water and after tape removal (adhesive tape used: Scotch™ 610-1PK from 3M) for a total duration of 1 hour, the assessment being made after 0.5 and 1 hour.

Assessment was made using the system of ratings stipulated in the standard, with 0 denoting no delamination at all and 5 corresponding to appropriately sheetlike delamination.

Independently of the UV curing dose utilized, both coatings gave flawless base adhesion to the substrate (test a.)). After 30 minutes in boiling water, as per test b.), both coatings continued to give no reasons for concern. Only after one hour of storage in boiling water did the coatings undergo delamination from the substrate after tape removal.

Example 1 shows that, under the conditions and parameters selected, coating materials can be applied in-line on an extrusion line, to give a coating outcome featuring good optical quality.

For the further optimization of the adhesion, examples 2 and 3 below were carried out off-line, but under conditions mimicking those of in-line production.

Example 2 (Inventive)

a) Production of the Twin-Web Sandwich Panel

Twin-web sandwich panels, 10 mm, with a coextrusion layer on one side were obtained from the following composition:

The base material used was a mixture of equal proportions of Makrolon®1243 (branched bisphenol A polycarbonate from Bayer AG, Leverkusen, having a melt flow index (MFR) to ISO 1133 of 6.5 g/10 min at 300° C. under a load of 1.2 kg) and Makrolon® 3103 (branched bisphenol A polycarbonate from Bayer AG, Leverkusen, having a melt flow index (MFR) to ISO 1133 of 6.5 g/10 min at 300° C. under a load of 1.2 kg).

This material was coextruded with a polycarbonate based on Malcrolon® 3108 (linear bisphenol A polycarbonate from Bayer AG, Leverkusen, having a melt flow index (MFR) to ISO 1133 of 6.5 g/10 min at 300° C. under a load of 1.2 kg). The thickness of the coextrusion layer is in each case approximately 50 µm.

In this case, the material of the coextrusion layer, in addition to 0.25% of pentaerythritol tetrastearate (PETS, available commercially as Loxiol® VPG 861 from Cognis, Düsseldorf, Germany), also contains a UV absorber based on a benzotriazole (2,2'-methylenebis(6-(2H-benzotriazol-2-yl)-4-1,1,3, 3-tetramethylbutyl)phenol, available commercially from Ciba, Switzerland, as Tinuvin 360®).

The coextrusion line was made up of the following tools and machinery:
  a single-screw extruder (devolatilizing extruder, screw diameter 70 mm and a single screw of length 33 D, Einschnecke, Reifenhäuser, Troisdorf/Germany).
  The extruder is fitted with a vacuum melt devolatilization system.
  A two-layer coextrusion adapter (fixed adapter from Bexsol, Italy)
  A three-zone coextruder (screw diameter 30 mm, single screw of length 25 D, Omipa, Italy)
  A sandwich panel die with a width of 500 mm, for sandwich panel thicknesses from 8 to 45 mm, from Bexsol, Italy
  A two-part vacuum calibrator, width 500 mm, length 2×950 mm, from Breyer, Singen/Germany
  The roller bed; roller bed length (distance from calibrator to cutting section) 3.5 m
  The take-off device
  The transverse severing device (knife)
  The lay-down platform.

The sandwich panel with a coextrusion layer on one side was produced as follows: the polycarbonate pellets of the base material were supplied to the filling hopper of the main extruder, the coextrusion material to that of the coextruder. In the respective cylinder/screw plasticating system, each material was melted and conveyed. The two material melts were combined in the coex adapter, and formed a composite after exiting the die and cooling. The other devices were used for transport, cutting to length and laying-down of the extruded panels.

The temperature of the individual barrels of the main extruder were 240° C. to 260° C., and the resulting melt temperature was 250° C. to 255° C. The screw speed of the melt pump was 67 rpm. The take-off speed was 1.1 m/min. The barrel temperatures of the coextruder were 265° C. and the resulting melt temperature was about 263° C. The screw speed of the melt pump was 12 rpm.

The twin-web sandwich panels were cut to DINA4 size. The thickness of the coex layer on the coextruded sandwich panel was 50 µm.

b) Production of the Coating Composition

First of all, a stirring vessel with stirrer and stirring assembly was charged with 20.95 g of 1,6-hexanediol diaciylate as reactive diluent (RD). Thereafter, at 500 rpm, in succession, 3.81 g of Irgacure 184, 0.95 g of Lucirin TPO-L, 1.05 g of Tinuvin 479 and 0.48 g of BYK 302 were added in succession, with stirring in each case until the additive in question had dissolved homogeneously. This was followed by stirring for 5 minutes.

Subsequently, with continuous stirring, 68.00 g of the first coating material, Desmolux® U 680 H, were added to the additive solution, and the formulation was homogenized for a further 10 minutes. To make up the batch, 4.76 g of the second coating material, Desmolux® D 100, were added in a similar way, and the mixture was again homogenized for 10 minutes.

The coating solution produced in this way, prior to application, was filtered through a pressure suction filter, using a commercial Whatman® cellulose filter, grade 40 from Whatman International Ltd, with a pore size of 8 μm.

c) Further Treatment of the Panels

The panels were treated further under conditions closely matching those of in-line production, in order to simulate complete in-line production of the panels. Further treatment and coating took place on one side, on the coextrusion layer.

c.1) Pretreatment

The pretreatment of the uncoated panels was carried out using a U300-M-1-TR UV unit from IST Strahlentechnik GmbH, Nürtingen, with a type MC200 mercury lamp (output 80 W/cm). The dose needed for the pretreatment was determined using an eta plus UMD-1 dosimeter from eta plus electronic. At a speed of 4 m/min in a continuous pass through the UV unit described, a total radiation intensity of 0.95 J/cm$^2$ was utilized for the surface activation of the uncoated panels.

c.2) Application of the Coating Materials to Twin-Web Sandwich Panels

The coating composition produced under 2b) was applied using a commercial knifecoater (target wet film thickness 40 μm) to one side of the twin-web sandwich panels (DINA4 size). The temperature of the coating solution was around 40° C. and that of the twin-web sandwich panel was around 80° C., in order to simulate production conditions. After a flash-off phase of 10 seconds at 20° C. to 25° C., the coated panels were conditioned in a forced-air oven at 80° C. for 30 seconds.

c.3) Curing of the Coated Twin-Web Sandwich Panels by UV Radiation

The UV curing of the coated panels was carried out using a U300-M-1-TR UV unit from IST Strahlentechnik GmbH, Nürtingen, with a type MC200 mercury lamp (output 80 W/cm). The dose required for curing was determined using an eta plus UMD-1 dosimeter from eta plus electronic. At a continuous curing speed of 4 m/min, with 2 passes through the UV unit described, a total radiation intensity of 2*0.95 J/cm$^2$→1.9 J/cm$^2$ was utilized for the curing of the coated panels.

Example 3 (Inventive)

a) The production of the twin-web sandwich panel took place in the same way as for Example 1a).

b) Production of the Coating Composition

First of all, a stirring vessel with stirrer and stirring assembly was charged with 34.55 g of 1,6-hexanediol diacrylate as reactive diluent (RD). Thereafter, at 500 rpm, in succession, 3.81 g of Irgacure 184, 0.95 g of Lucirin TPO-L, 1.05 g of Tinuvin 479 and 0.48 g of BYK 302 were added in succession, with stirring in each case until the additive in question had dissolved homogeneously. This was followed by stirring for 5 minutes. Subsequently, with continuous stirring, 54.40 g of the first coating material, Desmolux® XP 2666, were added to the additive solution, and the formulation was homogenized for a further 10 minutes. To make up the batch, 4.76 g of the second coating material, Desmolux® D 100, were added in a similar way, and the mixture was again homogenized for 10 minutes.

The coating solution produced in this way, prior to application, was filtered through a pressure suction filter, using a commercial Whatman® cellulose filter, grade 40 from Whatman International Ltd, with a pore size of 8 μm.

c) The further treatment of the panels took place in the same way as for Example 1c). The panels were coated with a coating composition produced under 2b).

Example 4 (Comparative)

Commercially available twin-web sandwich panel with in-line coating, made of Lexan® Thermoclear Plus 2 UV, no urethane acrylate coating Example 5 (Comparative)

Commercially available, weathering-stable, twin-web sandwich panel, produced in-line, Makrolon® multi UV no drop (Bayer Sheet Europe), coextruded polycarbonate outer face (side A)

Example 6 (Comparative)

Commercially available, weathering-stable, twin-web sandwich panel, produced in-line, Makrolon® multi UV no drop (Bayer Sheet Europe), inside (side B) coated in-line with water-spreading silica sol layer Tests on the Panels All of the tests were completed on cured, coated samples. The following tests were carried out.

Abrasion Resistance by Taber Abrasion Tester, and Scattered Light Measurement to DIN 52347

From each of the panels, a flat test specimen with dimensions of 100 mm×100 mm was produced. To improve handling, the webs of the test specimens were severed parallel to the plane of the belt. The initial haze value of this test specimen was determined in accordance with ASTM D1003, by using a Haze Gard Plus from BYK-Gardner. Subsequently the coated side of the test specimen was subjected to scratching using a Taber Abraser model 5131 from Erichsen in accordance with DIN 52347 or ASTM D1044, using the CS10F wheels (type IV; grey colour) and a 500 g applied weight per abrading wheel. Through determination of the final haze value after 25, 100, 500 and 1000 revolutions, Δ haze values for the test specimen were determined, from the difference between final haze value at given number of rotations, and initial haze value.

Scratch Resistance by Pencil Hardness Tester to ISO 15184 or ASTM D3363

A flat test specimen was produced from the panels, and was attached to a glass plate. The pencil hardness was determined using the Wolf-Wilburn pencil hardness tester from BYK-Gardner, with pencils from Cretacolor. In this test, on the basis of ISO 15184, the grade of pencil was identified that just no longer causes any surface damage in the test arrangement at a 45° angle and under a pressure of 750 g.

Adhesive Strength by Means of Cross-Hatch Test to EN ISO 2409/ASTM D3359

The adhesive strength of the coatings on the panel was ascertained. Assessments were made of a.) the cross-hatch with and without tape removal (adhesive tape used: Scotch™ 610-1PK from 3M), and b.) the cross-hatch after storage in 98° C. water after tape removal (adhesive tape used: Scotch™ 610-1PK from 3M) for a total duration of 4 hours, with assessment being made after 1, 2 and 4 hours.

and after the corresponding weathering time of ASTM E313, and the difference was reported as the result. The higher the difference in the two corresponding yellowness indices, the greater the yellowing for a given weathering time.

The results of the tests on specimens taken from the coated panels of Examples 1-5 are compiled in Table 1.

TABLE 1

Results of the tests

| Coated panel, example | | 2 | 3 | 4 | 5 | 6 |
|---|---|---|---|---|---|---|
| Layer thickness [μm] | | about 16 | about 16 | about 4 | about 50 | about 0.3 |
| Transparency [%] | | 92.0 | 88.9 | 89.5 | 89.4 | 91.3 |
| Haze [%] | | 4.4 | 5.4 | 6.8 | 7.4 | 5.6 |
| Abrasion resistance | 25 cycles | 5.2 | 5.5 | 13.8 | 19.7 | 11.1 |
| (Δ haze in [%]) | 100 cycles | 13.2 | 15.9 | 25.0 | 22.2 | 14.7 |
| Pencil hardness | 750 g load | 2H | 2H | H | <6B | <6B |
| Adhesion (cross-hatch without tape removal) | | 0 | 0 | 0 | not applicable | 0 |
| Adhesion (cross-hatch after tape removal and storage in 98° C. water) | 0 h at 98° C. | 0 | 0 | 0 | not applicable | 0 |
| | 1 h at 98° C. | 0 | 0 | 0 | not applicable | 0 |
| | 2 h at 98° C. | 0 | 0 | 0 | not applicable | 0 |
| | 4 h at 98° C. | 0 | 0 | 0 | not applicable | 0 |
| Weathering stability | ΔYI after 4200 h/Xe-WOM 0.51 | 1.4 | 1.7 | 5.5 | 3.1 | not determined |
| Solvent resistance[1] (1/15/30/60 min) | Acetone | +/+/+/+ | +/+/+/+ | +/−/−/− | −/−/−/− | −/−/−/− |
| | Butyl acetate | +/+/+/+ | +/+/+/+ | +/−/−/− | −/−/−/− | −/−/−/− |
| | Xylene | +/+/+/+ | +/+/+/+ | +/−/−/− | −/−/−/− | −/−/−/− |
| Chemical resistance at given temperature[1] | 50° C. NaOH | + | + | + | − | + |
| | 50° C. H$_2$SO$_4$ | + | + | + | + | + |
| | 70° C. NaOH | + | + | + | − | − |
| | 70° C. H$_2$SO$_4$ | + | + | − | + | + |

[1]"−"→ unsatisfactory; "+"→ satisfactory; "0"→ no delamination at all

Assessment was made in accordance with the system of ratings indicated in the standard, with 0 denoting no delamination at all and 5 corresponding to appropriately sheetlike delaminations.

Chemical Resistance

A flat test specimen was produced from each of the panels. One drop of 1% strength sulphuric acid and one drop of 1% strength aqueous sodium hydroxide solution were applied to the test specimens and covered with a watch glass. The surfaces thus treated were heated in a forced-air oven at 50° C. or 70° C. for one hour. After the exposure time had elapsed, the samples were cleaned under running water and then inspected.

Solvent Resistance

A flat test specimen was produced from each of the panels. One drop each of acetone, butyl acetate and xylene was applied to the test specimens, and covered with a watch glass. The surfaces thus treated were cleaned under running water after exposure times at room temperature (approximately 23° C.) of 5 minutes, 15 minutes, 30 minutes and 1 hour, and then inspected.

Thickness of the Protective Layer

The thicknesses of the protective layers were determined using an ETA-SST white light interferometer from ETA-Optik GmbH.

Weathering Stability

Weathering took place in a Ci65 from Atlas with a radiation intensity of 0.51 W/m$^2$/nm at 340 nm in a 102:18 dry/wet cycle. The filters selected were boro/boro (daylight filtering), the black standard temperature was 60 (±2)° C., and the sample chamber temperature was 38 (±2)° C. (dry cycle), along the lines of DIN ISO 4892. As a measure of the yellowing, a determination was made of the yellowness index before The results show that coated products of the invention can be produced from the acrylate-containing coatings under production conditions which can be transposed to an in-line production process, the said products a) being comparable with or better than, in terms of optical quality (transparency, haze), commercially available, in-line-coated products, b) exceeding, in some cases significantly, in terms of weathering stability, abrasion resistance and hardness, and also in solvent resistance and chemical resistance, the commercially available, in-line-coated comparison products, and c) having coatings which adhere as well as those of the commercially available, in-line-coated comparison products, and d) being free from solvent residues.

Accordingly it is possible to process the coatings in the environmentally benign and economic in-line process of the invention to give the very-high-quality coated products of the invention.

The invention claimed is:

1. A method of producing a multi-layer product comprising a) a substrate comprising at least one substrate layer and b) at least one protective layer, wherein the substrate layer(s) comprise a thermoplastic polymer, and the protective layer(s) is a coating composition obtained from A. 30 to 80% by weight of one or more compounds selected from the group consisting of compounds which possess a molar mass of more than 450 g/mol and possess at least two functional groups that react by exposure to actinic radiation with ethylenically unsaturated compounds, with polymerization, and which have no isocyanate groups and wherein the one or more compounds is/are selected from urethane acrylates, which have at least one allophanate group, hexamethylene diisocyanate (HDI) trimer group, biuret group, uretdione group and/or isocyanurate group in the molecule;

B. 15 to 50% by weight of reactive diluents comprising at least two ethylenically unsaturated groups;

C. 0 to 50% by weight of one or more compounds selected from the group consisting of isocyanates having at least one ethylenically unsaturated double bond in the molecule, D. 0.01 to 10% by weight of light stabilizers based on a triazine derivative;

E. 1 to 10% by weight of photoinitiators; and

F. further coatings additives;

wherein the amount of all of the aforementioned components used in the coating composition being 100% by weight, and the coating composition, following application, being cured by actinic radiation to form a thermoset protective layer, and wherein the protective layer(s) is/are applied in-line directly following the production of the substrate comprising the substrate layers and has an extrusion rate of 1 to 7 m/min.

2. The method according to claim 1, wherein the substrate layer(s) are produced by (co)extrusion.

3. The method according to claim 1, wherein the protective layer(s) are applied by knifecoating, pouring or rolling.

4. The method according to claim 1, wherein the substrate, before the application of the protective layer(s), possesses a temperature of 60-90° C.

5. The method according to claim 4, wherein the extrusion rate is 1 to 2.5 m/min.

6. The method according to claim 1, wherein the coated substrate, in the course of curing with actinic radiation with a UV cure dose of 500 to 4000 mJ/cm$^2$, does not exceed a temperature of 90° C.

7. The method according to claim 1 for producing films and sheets.

8. The method according to claim 7, wherein the sheets are solid sheets or sandwich sheets.

9. The method according to claim 8, wherein said sandwich sheets have 2 to 8 struts.

10. The method according to claim 1, wherein the coating is free from solvent residues.

11. The method according to claim 1, wherein the thermoplastic polymers of the substrate layer(s) are selected from the group consisting of poly(meth)acrylates, homopolycarbonates, copolycarbonates, thermoplastic polyestercarbonates, and combinations thereof.

* * * * *